United States Patent [19]
Gorog et al.

[11] 4,084,188
[45] Apr. 11, 1978

[54] OPTICAL SCANNER

[75] Inventors: Istvan Gorog; Brown F. Williams, both of Princeton, N.J.

[73] Assignee: RCA Corporation, New York, N.Y.

[21] Appl. No.: 741,719

[22] Filed: Nov. 15, 1976

[51] Int. Cl.² .............................................. H04N 3/14
[52] U.S. Cl. ............................... 358/199; 358/200; 358/206; 358/285; 350/311
[58] Field of Search ............... 358/285, 199, 213, 200, 358/206; 350/311

[56] References Cited
U.S. PATENT DOCUMENTS

| | | | |
|---|---|---|---|
| 3,802,775 | 4/1974 | Hughes | 350/311 |
| 3,802,775 | 4/1974 | Hughes | 350/311 |
| 3,953,667 | 4/1976 | Layton | 358/113 |
| 3,984,629 | 10/1976 | Gorog | 358/285 |
| 3,984,629 | 10/1976 | Gorog | 358/285 |

*Primary Examiner*—Robert L. Griffin
*Assistant Examiner*—Edward L. Coles
*Attorney, Agent, or Firm*—H. Christoffersen; Samuel Cohen; Carl V. Olson

[57] ABSTRACT

An optical scanner is disclosed for scanning a three-dimensional object or a two-dimensional document located in a space which is open and exposed to ambient light. Light from a laser is directed through a beam splitter and a deflector to the object or document, from which it is reflected back through the deflector, and from the beam splitter through a narrow-band optical interference filter to a photodetector. The laser light is modulated at a carrier frequency rate, and the electrical signal from the photodetector is demodulated to produce a video signal free of disturbances due to ambient light.

7 Claims, 1 Drawing Figure

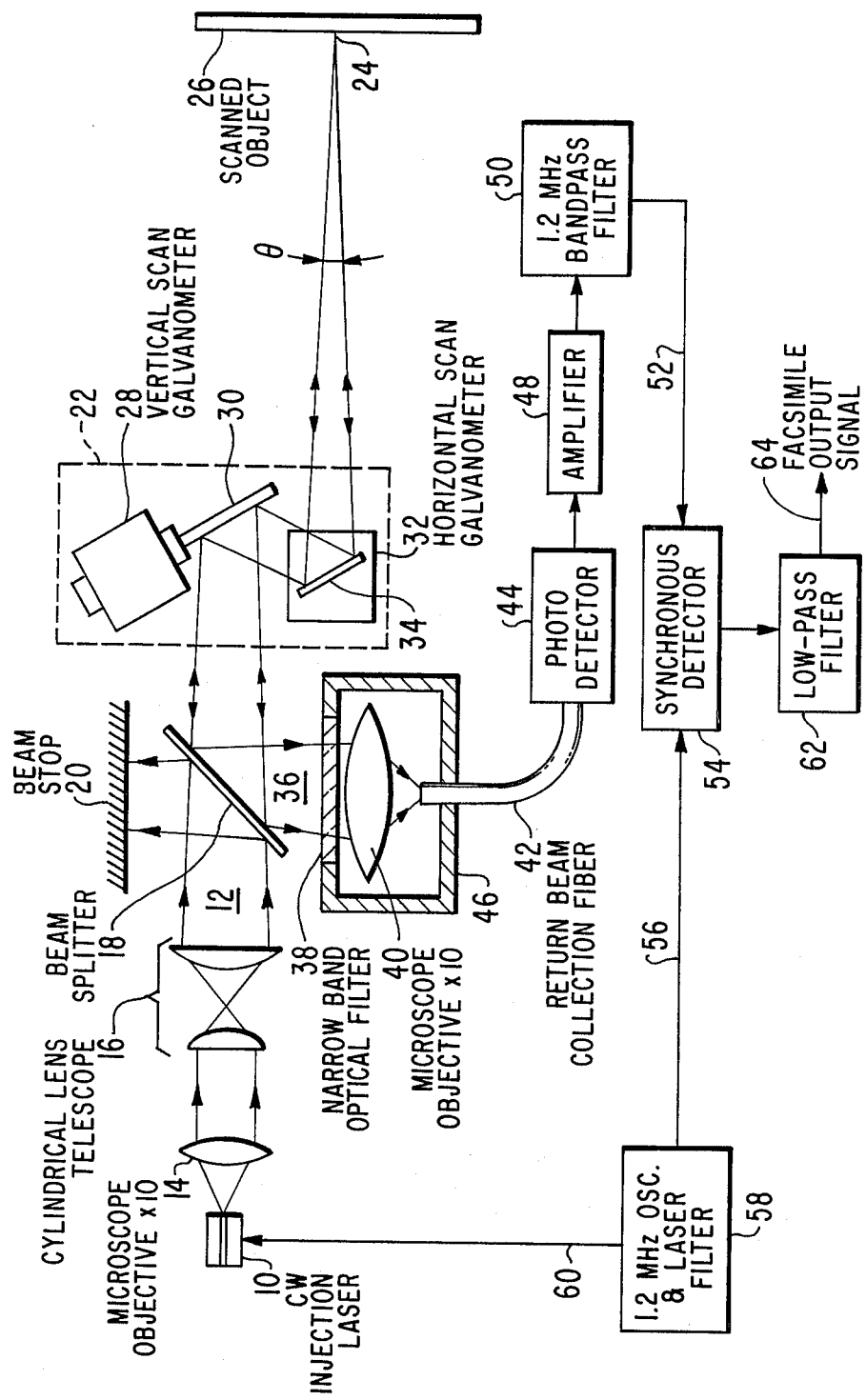

OPTICAL SCANNER

There are many known types of facsimile scanners in which a graphic document is scanned by a beam of light, and the light reflected from the document is translated to a video electrical signal that can be used elsewhere to reproduce the document. Such facsimile scanners are operated in an enclosure which shields the photodetector from disturbing ambient light, and are unsatisfactory for use in applications where it is desirable or necessary to have the document in the open and exposed to ambient light. The existing scanners are also unsatisfactory for scanning three-dimensional objects which move to and from an exposed location where the scanning is performed, such as where the scanner is a part of an object-measuring system. In these applications, the amplitude of varying ambient light reaching the photodetector may be many times greater than the amplitude of the desired light reflected from the object, and the output electrical video signal may be unusable because of the disturbing effects caused by the ambient light. While the signal-to-noise ratio of desired light reflected from the subject, to the ambient light noise, can be improved by employing a more powerful laser, considerations of user safety make it highly desirable to employ a laser of as low a power as possible.

A scanner arrangement which greatly reduces the effects of ambient light is described in U.S. Pat. No. 3,984,629, issued on Oct. 5, 1976, to Istvan Gorog on a "Flying Spot Scanner Unaffected By Ambient Light." The noise reduction is accomplished by modulating the light beam output of the laser at a high rate such as 1.2 MHz, so that the electrical signal rom the photodetector is a 1.2 MHz carrier modulated by the graphic information of the object scanned. The modulated carrier is separated from the low-frequency ambient noise components, and is demodulated to produce the desired graphic information signal free of the ambient light noise components.

The photodetector in the patented system is spaced from the scanned object, and it receives light reflected in succession from all points on the scanned object. As a result, the photodetector must accept light coming from all angles within a solid cone or prism represented at 26 in the patent. This prevents the use of a sufficiently narrow-band optical filter in front of the photodetector to block light of all frequencies other than the frequency of light from the laser. The narrowness of the frequency pass band of an interference-type optical filter depends on the degree of collimation of the applied light beam. That is, a narrow-band interference-type optical filter blocks all frequencies outside the narrow band for which it is designed only when the light rays applied to the filter are parallel or nearly parallel. It is desirable that the optical scanner be constructed in such a way that the light rays reflected to the photodetector are substantially parallel, so that a very narrow-band optical filter can be used to prevent ambient light frequencies other than the frequency of the laser from reaching the photodetector.

According to an embodiment of the invention, an optical scanner for scanning an object exposed to ambient light is constructed in such an "on-axis" way that, at any given instant, the photodetector receives light reflected solely from the small spot on the object which is illuminated by the laser beam at that given instant. The scanner is constructed so that the light relfected to the photodetector consists of substantially parallel rays, and a very narrow-band optical filter is used at the input to the photodetector to prevent receipt by the photodetector of light having frequency components different from those produced by the laser.

In the drawing, the sole FIGURE is a diagram showing mechanical, optical and electronic components of an optical scanning system constructed according to the teachings of the invention.

In the drawing, there is shown a continuous-wave injection laser 10 which produces a converging beam of light 12 formed by a microscope objective 14 and a cylindrical lens telescope 16. The beam is directed to a beam splitter 18, from which half of the beam is reflected to a beam stop 20. The other half of the beam passes through the beam splitter 18 and through a beam-scanning deflector 22 to a small spot 24 on a scanned object or document 26. The wasting of half the light from the laser by the simple beam splitter shown can be avoided, if desired, by using a polarizing beam splitter in a known arrangement with quarter-wave plates. The scanning deflector 22 may consist of a vertical scan galvanometer motor 28 for oscillating a vertical scan mirror 30, and a horizontal scan galvanometer motor 32 for oscillating a horizontal scan mirror 34. The elements thus far described, with the exception of the beam splitter 18, may be as described in detail in the aforementioned U.S. Pat. No. 3,984,629.

The laser light beam converges in the angle $\theta$ to the small spot 24 on the scanned object 26 at any one given instant of time. Light is reflected at many angles from the illuminated spot 24 on the object, but only the light reflected back within the narrow angle $\theta$ is utilized in the scanner by being directed back through scan deflector 22 to beam splitter 18, from which light is reflected along path 36 through a narrow-band optical filter 38, a microscope objective 40, and an optical fiber 42 to a photodetector 44. A light-shielding enclosure 46 is provided around at least the light path from the optical filter 38 to the optical fiber 42. This prevents ambient light and laser light from reaching the photodetector 44 without going through the narrow-band optical filter 38.

The electrical output signal from the photodetector 44 is passed through an amplifier 48 and a band-pass filter 50 over a line 52 to one input of a synchronous detector 54. The synchronous detector 54 receives another input signal over line 56 from a source 58 of oscillations applied also over line 60 to drive the laser 10. The demodulated output signal of the detector 54 is passed through a low-pass filter 62 to a facsimile output signal line 64. These elements may be the same as those described in detail in the aforementioned U.S. Pat. No. 3,984,629.

The laser driver 58 energizes the laser at 1.2 MHz, for example, and causes the light emitted from the laser to be modulated at that frequency. Laser light reflected from the scanned object 26 to the photodetector 44 produces an electrical output signal from the photodetector 44 which is a 1.2 MHz carrier amplitude modulated by the graphic information of the scanned object 26. Lower frequency components due to variations in the ambient light are removed by band-pass filter 50, and the synchronous detector 54 extracts the desired modulation from the carrier wave. The desired output signal from the detector or demodulator 54 is passed by low-pass filter 62 to the facsimile output signal line 64. In this way all ambient noise frequency components below the frequencies passed by filter 50 are prevented from appearing on the output line 64.

The optical filter 38 is a narrow-band interference filter designed to pass light having the wavelength of the light from the laser 10. An interference filter is an optical-physical device consisting of vacuum-deposited chemical layers arranged so that the multiple reflections from the layer boundaries at wavelengths outside the pass-band interfere and cancel each other in the forward transmission direction, whereas wavelengths within the pass-band combine and reinforce each other and are transmitted. The simplest form of interference filter is the Fabry-Perot filter made of metal layers separated by a dielectric layer. Improved filters are constructed of non-absorbing all-dielectric multi-layer stacks combined with a sharp-cut long-pass colored glass filter to block low wavelengths that may be passed by the stack.

As pointed out above, the narrow-band optical filter 38 ideally should be selected to pass solely the light having the wavelength of light from laser 10. If the laser is a gallium arsenide (GaAs) laser, it may emit light having a wavelength in the region of 9040 angstroms (904 nanometers or 904 millimicrons), with a bandwidth of about 10 angstroms. A suitable filter 38 to use with a GaAs laser would be a narrow band-pass interference filter having a pass-band of 450 angstroms at a center wavelength of 9040 angstroms. A filter having these specifications for a light beam having incident rays which diverge or converge within an angle of not more than 25° is available from stock from OCLI Optical Coating Laboratory, Inc. of Santa Rosa, California, 95401. This filter has a 450 angstrom pass-band, which is quite a bit wider than the laser light bandwidth of about 10 angstroms.

In applications of the invention where ambient light noise is severe, it would be better to use an optical filter 38 having a narrower pass-band, so that it will reject more of the ambient light noise having wavelengths in the vicinity of the laser wavelengths. Interference filters can be constructed to have a narrower pass-band provided that light beam rays incident to the filter are more nearly parallel to each other. Stated another way, the narrowness of the filter pass-band is a function of how nearly the incident light rays are collimated. If the light incident to the filter is within a solid angle of about 15°, interference filters are commercially available from suppliers such as Corion Corporation, Holliston, Maine, 01746, with a center wavelength of 9050 angstroms, and a pass-band of only 40 angstroms.

The optical scanning system shown in the drawing has the novel characteristic that the light directed to the interference filter 38 is nearly collimated, and therefore, the interference filter 38 can have a very narrow pass-band to provide discrimination against all ambient optical noise wavelengths except those insignificant few components which are at, and very close to, the wavelength of the light from the laser 10. In the drawing, the light beam incident to the filter 38 is within a diverging cone of angle $\theta$ which may typically be between 0.5° and 10°. These narrow angles permit the use of the narrowest band inteference filters at 38. By contrast, the prior art scanner system shown in the aforementioned U.S. Pat. No. 3,984,629 cannot utilize the very narrow band interference filters because light reaches the photodetector in a converging cone having a large angle 26 in the patent determined by the size of the object scanned.

What is claimed is:

1. Apparatus for optically scanning an object exposed to ambient light to produce a video facsimile signal unaffected by the ambient light, comprising
    a light beam source,
    a beam splitter,
    a beam deflector,
    optical means directing light from said source in a beam passing through said beam splitter and said beam deflector to a place of an object to be scanned,
    a narrow-band optical interference filter constructed and positioned to pass light, having the wavelength of said source, which is reflected from a scanned object back through the beam deflector and the beam splitter, and
    a photodetector positioned to receive light passed by said optical interference filter and operative to produce an electrical video facsimile signal representing the scanned object.

2. Apparatus as defined in claim 1 and, in addition, means shielding the said photodetector from extraneous light not passing through said filter.

3. Apparatus as defined in claim 2 wherein said shielding means includes an optical fiber.

4. Apparatus as defined in claim 1 and, in addition, means to modulate the amplitude of the light beam from said source at a carrier frequency, and
    means to detect the modulation on a resulting electrical carrier signal from said photodetector to produce an electrical video facsimile signal representing the scanned object.

5. Apparatus as defined in claim 1 wherein said light beam source is a laser.

6. Apparatus as defined in claim 5 wherein said laser is a semiconductor injection laser.

7. Apparatus for optically scanning an object exposed to ambient light to produce a video facsimile signal unaffected by the ambient light, comprising
    a laser light beam source,
    means to modulate the amplitude of the light beam at a carrier frequency,
    a beam splitter,
    a beam deflector,
    optical means directing light from said source in a beam passing through said beam splitter and said beam deflector to a place of an object to be scanned,
    a narrow-band optical interference filter constructed and positioned to pass light, having the wavelength of said source, which is reflected from a a scanned object back through the beam deflector and the beam splitter,
    a photodetector positioned to receive light passed by said optical interference filter,
    means shielding the said photodetector from extraneous light not passing through said filter, and
    means to detect the modulation on a resulting electrical carrier signal from said photodetector to produce a video facsimile signal representing the scanned object.

* * * * *